2,912,810
Patented Nov. 17, 1959

2,912,810
PROCESS OF PICKING COTTON

Frederick T. Lense, Birmingham, Ala., assignor to Monsanto Chemical Company, St. Louis, Mo., a corporation of Delaware No Drawing. Application August 18, 1958
Serial No. 755,393

10 Claims. (Cl. 56—1)

The present invention relates to the picking and further processing of cotton, and more particularly relates to the application of fluids to cotton bolls preferably during a mechanical picking operation, and the subsequent processing of the picked cotton into spun cotton yarns or other cotton textile products.

The picking of cotton by mechanical cotton picking machines, as currently practiced, involves the use of pickers which, although they vary in details and intricacy of construction, operate on a somewhat similar principle of operation. Illustrative of the pickers which may be used are those described in U.S. Patent No. 2,699,638, issued to M. D. Rust on January 18, 1955; U.S. Patent No. 2,660,852, issued to L. A. Paradise on December 1, 1953; U.S. Patent No. 2,767,542, issued to Edward C. Bopf on October 23, 1956; and U.S. Patent No. 2,770,086, issued to H. M. Knoth on November 13, 1956. Mechanical pickers which are or have been used are the McCormick M–12–H and MD–12–H cotton pickers sold by the International Harvester Company of Chicago, Illinois; the one-row tractor-mounted cotton picker for Models CA, WD and WD–45, Allis-Chalmers tractors sold by Allis-Chalmers of Milwaukee, Wisconsin; the McCormick 2-row self-propelled cotton picker sold by International Harvester Company and described in its Bulletin No. 5, dated June 1956; and the Allis-Chalmers 2-row cotton picker sold by Allis-Chalmers. In general, these pickers comprise one or more row units for picking cotton which unit includes an upright drum comprising a plurality of picker bars or columns arranged to follow a circular or somewhat eliptical path for projecting rotating surfaces, for example, horizontally positioned and rotating picker spindles into plants and subsequently retracting such surfaces, for example, the loaded spindles, from the plant. This unit also includes spindle moisture applicator means through which the surfaces or spindles pass for application of water thereto prior to the passage of the surface or spindle through the plant to facilitate the transfer of the cotton boll from the plant to the surface or spindle and doffer means comprising a series of circular doffers mounted on an upright shaft parallel to the picking drum shaft. Usually each picker bar or column carries a plurality, for example, 10 to 20 or more rotating surfaces or picker spindles and a corresponding doffer is provided for each such surface or picker spindle to remove the picked cotton boll from the rotating surface or spindle. The doffed cotton boll is then conveyed by suitable means to a storage container which may be mounted on the picker unit or on a separate trailer. The cotton boll or seed cotton, as it is also known, is subsequently ginned to separate the seeds and some extraneous matter from the cotton fiber and the ginned fiber is baled prior to shipment to textile mills or other users.

In the past, as indicated above, it has been customary to apply water to the rotating surfaces or picker spindles in order to wet the cotton bolls which come into contact with the surfaces or spindles which causes the cotton bolls to adhere to the surfaces or spindles sufficiently to be picked from the plant and transferred to the surfaces or spindles. The cotton boll is then subsequently removed from the surfaces or spindles by the doffer. The amount of water thus applied to the cotton boll is insufficient to interfere with the subsequent ginning of the cotton. Certain difficulties have, however, been encountered heretofore in using water on the rotating surfaces or picker spindles. For example, when water is employed the surfaces or spindles tend to pick up waxes and plant juices which build up on the outside of the surfaces or spindles and ultimately so interfere with the efficient operation of the picking surfaces spindles that the picking operation must be discontinued and the picking surfaces or spindles must be cleaned before the picking operation can be continued. Also, the green and other coloring matter from the cotton plants tends to be picked up by the rotating surfaces or spindles from which it is transferred to the cotton bolls causing markoff or staining thereof. Further, the use of water per se on the rotating picker surfaces or picker spindles does not result in an optimum picking yield of cotton bolls from the cotton plant.

In accordance with the present invention on the other hand, it is possible to obviate or minimize the difficulties heretofore encountered in the use of water per se on rotating picking surfaces or picker spindles by applying to such surfaces or picker spindles a liquid dispersion of a water-insoluble inorganic compound, preferably an aqueous dispersion of colloidal silica. Moreover, the use of such dispersion results in increased picking efficiency over that obtained with water per se.

The processing of cotton from the cotton boll or seed cotton stage to final useful products involves the following general operations: (1) picking, wherein the cotton boll is removed from the plant; the resulting cotton is called seed cotton, (2) ginning, wherein the cotton fibers of the cotton boll are separated from the seed and some extraneous matter such as dirt and vegetable fragments from the plant; the resulting cotton is called ginned cotton, (3) baling, wherein the cotton fibers are compressed into bales for convenient shipping; and (4) breaking an opening wherein the bale is broken and the cotton is subjected to one or more beating or opening operations to place it in an open or fluffy condition. The cotton in stage (4) supra is referred to as opened cotton or raw stock. After stage (4), the cotton is handled and processed in various ways depending on the end use of the cotton fibers. For textile uses in the production of spun twisted yarns the opened cotton fibers are subjected to the following general operations: (5) picking, wherein the cotton fibers are further opened and formed into a lap; (6) carding, wherein the lap of fibers is formed into a fleece or carded web of at least partially parallelized fibers which is then condensed to form a sliver; and finally drawing, slubbing and spinning wherein the fibers are further parallelized, further condensed and finally twisted into a spun yarn.

It has been proposed heretofore in U.S. Patent No. 2,443,512 to Donald H. Powers and William J. Harrison, issued June 15, 1948 to apply colloidal solutions of silica to cotton raw stock in the opener, stage (4) supra, or subsequent thereto, for example, to the sliver. Other subsequent prior art has suggested application of colloidal solutions of silica in the trunkline between the openers, stage (4) supra, and the picker, stage (5) supra. In the prior art proposals referred to above of applying colloidal solutions of silica to cotton fibers in the openers or some subsequent stage a number of processing problems are encountered. Thus, if the colloidal solutions are applied in the opener or at some stage subsequent to the picker, it is difficult if not impossible to obtain a uniform application of colloidal silica to the fiber without overwetting the cotton and producing neps or otherwise interfering with the subsequent opening and picking operations or the carding and drawing operations. On the other hand, if the colloidal solutions are applied in the trunkline between the opener and picker it has been possible by carefully controlled conditions to apply colloidal silica to the fibers in a relatively uniform manner without overwetting the fibers, but the application requires carefully controlled conditions and skilled operators and for these reasons many cotton textile mills which are unable or unwilling to operate under these conditions have not employed such process for the application of colloidal silica to cotton. Moreover, about 60% of the silica applied to the fibers by this method is removed from the fibers during subsequent operations so that more silica must be applied than should normally be necessary to achieve the desired effects. Accordingly, a definite need has existed and still exists in the cotton spinning industry for a process of applying colloidal silica to cotton fibers to obtain the enhanced spinning advantages thereof while avoiding the application difficulties heretofore encountered as outlined above.

In accordance with the present invention, it is not only possible to apply aqueous dispersions of colloidal silica or other inter-fiber friction or drag promoting agents to cotton fibers on cotton bolls by means of rotating picking surfaces or picker spindles to obtain the advantages which thereby accrue in the picking of cotton with mechanical cotton pickers, but it is also possible to apply in such manner or in other ways sufficient colloidal silica or such agent to such cotton fibers so that sufficient colloidal silica or agent remains on the fibers during all of the subsequent processing operations through the spun yarn stage to facilitate the processing and spinning operations without the application disadvantages attendant in the prior art methods of applying colloidal solutions at the opening or subsequent stages, and without appreciable loss of silica from the fibers during subsequent processing which is almost always encountered by spraying dispersions of colloidal silica or such agent on fibers subsequent to the opening stage.

It is one object of this invention to provide an improved process of picking cotton utilizing rotating picking surfaces, for example, with mechanical pickers having projecting and rotating picker surfaces or spindles.

It is a further object of this invention to provide a novel process of applying colloidal silica or other inter-fiber friction promoting agents to the cotton fibers on cotton bolls either prior to, just prior to or concurrent with the picking of the cotton bolls, which colloidal silica or agent will facilitate the subsequent processing and/or ultimate spinning of yarns from such fibers.

It is a further object of this invention to provide a novel form of picked seed cotton having processing and other characteristics which differ from the ordinary picked seed cotton.

It is a further object of this invention to provide a novel form of ginned cotton having processing and other characteristics which differ from ordinary ginned cotton.

These and other objects of the present invention will be apparent from the following description and the appended claims.

The present invention is based on the discovery that the application of liquid dispersions, preferably aqueous dispersions, of water-insoluble inorganic compounds, preferably aqueous dispersions of colloidal inorganic oxides such as silica or alumina, to rotating picking surfaces such as are exemplified by the projecting (preferably, horizontally projecting) and rotating picker spindles of mechanical cotton pickers prior to engagement of such surfaces or spindles with the cotton bolls on cotton plants results in certain definite advantages in the picking operation. For instance, there is considerably less tendency for waxes and plant juices to build up on the rotating picking surfaces or picker spindles than is the case where water per se is used. In fact, in many instances no build up of wax or juices on such surfaces or spindles is noted during picking, and in many instances when wax contaminated surfaces or spindles (obtained by picking with water per se) are used such surfaces or spindles are actually cleaned by the use of such dispersions. This means that by using such dispersions on the rotating picking surfaces or spindles they can be utilized for picking for periods from 2 to 15 times longer, without cleaning, than in the case of surfaces or spindles on which water per se or water and a wetting agent is used. Also, when using such dispersions there is less transfer of green or other coloring matter from the plants to the picked cotton and consequently less markoff or staining of the fibers than is the case when water per se or water and a wetting agent is employed. This means that the picked cotton is cleaner in appearance and requires less subsequent cleaning treatment than the cotton obtained by the usual picking procedures. Further, the use of these dispersions on the rotating picking surfaces or spindles results in greater picking efficiency, that is, fewer unpicked bolls, due to the enhanced friction between the surface or spindle and the cotton boll. In addition, it has presently been found that sufficient amounts of the water-insoluble inorganic compound are transferred from the surface or spindle to the picked cotton to change the processing characteristics of the seed cotton and the ginned cotton.

In those instances where the inorganic compound is an inter-fiber friction promoting agent as in the case of colloidal silica, the cotton fibers also retain sufficient of the compound to increase the inter-fiber friction thereof and thus impart enhanced processing and spinning properties to the fibers. It will be understood, however, that the advantages of such agent on the cotton fibers can be obtained by applying dispersions of the inter-fiber friction promoting agent to the cotton bolls on the cotton plant at any stage varying from prior to picking to concurrent with picking without applying the dispersions by means of the rotating picking surface or spindle. Thus, the present invention also includes the application of dispersions, preferably aqueous dispersions, of an inter-fiber friction promoting agent, preferably colloidal silica, to the cotton bolls on cotton plants at any stage varying from prior to picking to concurrent with picking in a variety of ways, as, for example, by spraying or dripping the dispersions on the cotton bolls or by a wiping action where a surface (for example, a hand or the rotating picking surfaces or spindles) having a film of the dispersions is contacted with the cotton boll to transfer the dispersion from the surface to the cotton bolls. In such instances, the cotton bolls may be picked by hand, or by mechanical pickers or in other ways subsequent to or concurrently with the application of the dispersions to the cotton boll. It is preferred to carry out the application of the dispersions and the picking of the cotton bolls concurrently, but it is also quite satisfactory to apply the dispersions to the cotton bolls just prior to the picking of the bolls from the cotton plants.

In general and in those instances where the present invention is concerned with the advantages to be obtained in the picking operation by the use of rotating picking surfaces or spindles, it is possible to apply, preferably in the form of a film on such surface or spindle, relatively dilute dispersions of the water-insoluble inorganic compounds to such surfaces or spindles. The concentration of the compounds in such dispersions may vary to some extent depending on the particular compounds and the intended end use of the picked cotton. Usually a dispersion containing about 0.1 to 5% by weight of the inorganic compound will give suitable results in most instances, but it is to be understood that dispersions containing up to 15 or 20% by weight of such compound can be used. In those cases where the picked cotton is to be ultimately processed into spun, twisted yarns, it is desirable to employ a dispersion containing from about 0.3 to 12% by weight, preferably about 2.5 to about 10% by weight, of the inter-fiber friction or drag promoting agent such as colloidal silica.

Also, in those instances where the present invention is concerned with the advantages to be obtained in the picking operation by the use of rotating picking surfaces or spindles, the amount of the dispersion of the water-insoluble inorganic compound which is applied to such surface or spindle may vary depending on the inorganic compound used the viscosity of the dispersion, the concentration of the inorganic compound in the dispersion, the ease of wettability of the cotton fibers with the dispersion, the intended end use of the picked cotton and other factors. However, the amount of dispersion applied to such surfaces or spindles is preferably such that from about 20% up to 100% of the total amount of dispersion applied to such surfaces or spindles of the mechanical picker is actually transferred from the picking surfaces or spindles to the cotton fibers of the cotton bolls.

In those instances where the dispersion contains a water-insoluble inorganic compound which is an inter-fiber friction promoting agent and the picked cotton is to be ultimately processed into a spun twisted yarn, the amount of dispersion applied to the cotton fibers of the cotton bolls either by rotating picking surfaces or spindles or in other ways should be such that the picked seed cotton contains a sufficient amount of such agent to modify the inter-fiber friction properties of the cotton fibers of the seed cotton. This amount of dispersion required will vary depending on the particular agent used and the particle size thereof and the amount of inter-fiber friction modification desired, but is generally such that from about 0.02 to about 1% by weight, preferably about 0.08 to 0.7% by weight, of the agent is applied based on the bone dry ginned cotton fibers. A particularly preferred range is about 0.1 to 0.6%.

The aqueous dispersion of inorganic compound employed contains particles of the compound which are too large to provide a true solution but are sufficiently small so that not more than 10% of the particles settle out of the liquid phase during the picking operation. In most instances, it is preferred to employ dispersions in which the particles are in colloidal form, within the range of about 5 to 800 millimicrons, but it is also possible to employ dispersions containing particles of from 1 millimicron up to about 10 microns. The preferred dispersions from the point of particle size are those containing particles of 15 to 400 millimicrons, and more preferably from 20 to 200 millimicrons.

The water-insoluble inorganic compounds employed in the dispersions may be any of a large variety of water-insoluble metal or metalloid oxides, sulfates, carbonates, phosphates and the like. The compounds are preferably substantially colorless or white and are also preferably transparent or translucent in the solid particle state. However, for certain purposes where the cotton is employed in a form wherein the color thereof is not objectionable or is desirable, the inorganic compound may have a color or may be of a pigment nature. Also, if it is desired to impart a delustering effect to the cotton fibers the inorganic compound may be opaque. As examples of white or substantially colorless metal oxide compounds which may be used may be mentioned alumina, aluminum hydroxide, $TiO_2$, $Ti(OH)_4$, ZnO, MgO, vanadium oxide, $BaO_2$ and the like. Colored metal oxides include FeO, $Fe_2O_3$, CuO, MnO and the like. As examples of water-insoluble white or substantially colorless metalloid oxides which may be used may be mentioned silica which may be in the hydrated or anhydrous form, that is, as silicic acid or as $SiO_2$. As examples of water-insoluble sulfates may be mentioned the alkaline earth sulfates such as calcium and barium sulfates. As examples of water-insoluble carbonates may be mentioned the alkaline earth carbonates such as calcium and barium carbonates, zinc carbonate, aluminum carbonate and the like. As examples of water-insoluble phosphates which may be used may be mentioned calcium phosphates such as the water-insoluble alkaline earth phosphates such as dicalcium and tricalcium phosphate, hydroxy apatite, apatite, calcium metaphosphate, calcium pyrophosphate, as well as zinc phosphate, aluminum phosphates and the like. Various other water-insoluble inorganic compounds or solid inorganic elements may be psed such as diatomaceous earth, water-insoluble clays and others as will be apparent to those skilled in the art.

The term "water-insoluble" as used herein is intended to include inorganic compounds which are completely insoluble in water at a pH of 7 as well as compounds which are only slightly soluble in water to the extent of less than 1% by weight at such pH and at a temperature below 50° C.

As mentioned previously herein, if the picked cotton is to be processed into spun twisted yarn, the inorganic compound employed is preferably an inter-fiber friction promoting agent, that is, a compound which increases the inter-fiber friction or drag of the fibers. Not all of the inorganic compounds previously mentioned are suitable for this purpose or can be applied in sufficient amounts to achieve this result. However, the inter-fiber friction promoting agents which are suitable include silica, alumina, $TiO_2$, aluminum phosphate, magnesium carbonate and calcium carbonate. Of these, colloidal silica is the most effective not only as an inter-fiber friction promoting agent, but also because of its outstanding utility in picking cotton when applied to the rotating picking surfaces or picker spindles. Accordingly, colloidal silica is by far the preferred inorganic compound of this invention. The inorganic compound may be dispersed to form the dispersions hereinbefore referred to by preparing such compound as a "primary" dispersion. This term is intended to mean those dispersions in which the inorganic compound is formed therein in a dispersed state by chemical action or reaction. Such dispersions are preferred. However, "secondary" dispersions of the inorganic compounds may also be used. The term "secondary" dispersions is intended to mean those which are prepared mechanically by grinding or comminuting the particles in a liquid phase or by dispersing the proper size particles in a liquid phase by agitation with or without a dispersing agent.

Examples of primary dispersions are silica sols prepared by adsorbing the alkali metal ions of an alkali metal silicate with a cation-exchange resin and ageing the resulting silica particles until colloidal particles are obtained and stabilizing the sol with alkali. Examples of processes of preparing such silica sols are given in U.S. Patent No. 2,244,325 of Paul G. Bird, issued June 3, 1941 or U.S. Patent No. 2,457,971 of Vandeveer Voorhees issued January 4, 1949. Primary dispersions of silica aquasols can also be prepared by dispersing silica hydrogel by heating in the presence of alkaline ions as disclosed in U.S. Patent No. 2,375,738 to John F. White issued May 8, 1945 or by dispersing silica hydrogels by heating with a stable alkaline silica aquasol as described in U.S. Patent No. 2,572,578 to Henry S. Trail, issued October 23, 1951.

Examples of secondary dispersions are the silica sols prepared by heating a primary dispersion of colloidal silica at elevated temperatures above 100° C. in the presence of alkali until a thixotropic agglomerate of colloidal silica is obtained and dispersing such agglomerate in a colloid mill until a stable sol is obtained, as described in U.S. Patent No. 2,741,600 to Lyman S. Allen issued April 10, 1956.

In a preferred embodiment of this invention the dispersions employed are stable dispersions of colloidal silica, which can be primary or secondary dispersions, although primary dispersions are preferred. Such dispersions are normally stable for periods of 2 to 18 months or longer and have a pH within the range of about 8.5 to 10.7 and contain ultimate particles of silica of a size of about 10 to 40 millimicrons. The term "stable" is used in the sense that the dispersions are stable to gelation or to the settling of more than 10% by weight of the particles within the 2 to 18 month period specified. The average or agglomerate particle size of the silica particles may vary between about 15 and 400 millimicrons. Usually, these sols are stabilized by the presence of small amounts of alkali metal or ammonium ions in such quantities that the sols have a silica to alkali (calculated as $Na_2O$) weight ratio within the range of about 10:1 to 500:1, and as sold commercially have a silica concentration within the range of about 15 to 30% by weight. However, these dispersions can be obtained by dilution or by further concentration within the range of 0.01 to about 45% by weight of silica. The dispersions usually contain less than 0.2% by weight of a salt. Silica sols having characteristics or properties falling within the ranges given in this paragraph can be prepared by the processes of the Bird, Voorhees, White, Trail and Allen U.S. patents hereinbefore referred to. It is also possible to prepare sols with such characteristics by the processes described in U.S. Patent No. 2,515,949 to Vincent di Maio, issued July 18, 1950, U.S. Patent Nos. 2,515,960 and 2,515,961 to Morris D. Marshall, issued July 18, 1950, U.S. Patent No. 2,573,743 to Henry S. Trail, issued November 6, 1951 and U.S. Patent No. 2,577,485 to Joseph M. Rule, issued December 4, 1951.

The preferred dispersions are those primary dispersions of colloidal silica having the characteristics referred to in the preceding paragraph, but which are further characterized by having an extinction coefficient in excess of 0.025, preferably in excess of 0.035. It is possible to prepare primary dispersions having such characteristics by the processes described in U.S. Patents Nos. 2,375,738 and 2,572,578 hereinbefore referred to. The extinction coefficient is determined according to the following formula:

$$E = \frac{1}{PL} \times \log_{10} \frac{Io}{I}$$

where E is the extinction coefficient, L is the light path in centimeters $$\log_{10} \frac{Io}{I}$$

is the absorbance of optical density of the system for a given wave length and P is the percent solids. The extinction coefficient values given herein were determined from the above formula using data obtained on the sols from a Beckman model DU spectrophotometer with 1 centimeter cells and using light having a wave length of 325 millimicrons.

The dispersions of this invention may also contain a compatible wetting agent to facilitate the wetting of the cotton fibers in the bolls during the application of the dispersions thereto, for example, in the picking operation and the consequent spreading of the liquid phase of the dispersions through the cotton fibers. In most instances the anionic and non-ionic wetting agents are compatible with the water-insoluble inorganic compounds employed herein, particularly when the liquid phase is water and the dispersions have a pH within the range of about 5 to 11. Such wetting agents may be present in the dispersions in varying amounts, but it is usually only necessary to use small amounts of such wetting agents, for example, a concentration of about 0.001 to 1% by weight, thereof, based on the dispersion.

As examples of suitable anionic wetting agents, for example those which dissociate in water into an alkali, ammonium or amine cation and an organic anion, are alkali metal ammonium or amine salts of sulfonated or sulfated organic compounds, particularly hydrocarbons or alcohols containing 8 or more, preferably 10 to 20 carbon atoms. Sub-generic classes of such compounds are sodium salts of long-chain alkyl sulfates, sodium salts of alkyl naphthalene sulfonic acids, sodium salts of sulfonated abietenes, sodium salts of alkylbenzene sulfonic acids, particularly those in which the alkyl group contains 8 to 16 carbon atoms, sodium salts of sulfonated mineral oils, sodium salts of sulfonated or sulfated long-chain alcohols, sodium salts of sulfosuccinic esters such as sodium dioctyl sulfosuccinate, and the like.

As examples of suitable non-ionic wetting agents, for example, those which are soluble or colloidally dispersible in water, are the condensation products of hydrophobic organic compounds having one to two reactive hydrogen atoms with sufficient ethylene oxide to provide such solubility or colloidal dispersibility. As examples of such organic compounds which are condensed with ethylene oxide may be mentioned monohydric alcohols containing at least 6, preferably 8 to 20 carbon atoms; mercaptans having a single —SH group and containing at least 6, preferably 8 to 20 carbon atoms; fatty monoamines or monoamides containing at least 6, preferably 8 to 20 carbon atoms; monoalkyl phenols having at least 6, preferably 8 to 16 carbon atoms, in the alkyl group; condensates of from about 2 to 10 mols of propylene oxide with 1 mol of the aforementioned organic compounds; and condensates of about 6 to 15 mols of propylene oxide with lower alcohols such as methanol, ethanol, propanol, and butanol. The condensation of the organic compound and ethylene oxide may be carried out in the presence of an alkaline catalyst such as NaOH, KOH or a sodium or potassium alcoholate such as sodium or potassium methylate, ethylate, etc., and as described in greater detail in the U.S. Patents No. 1,970,578 to Scholler et al., No. 2,213,477 to Steindorff et al., Nos. 2,174,761 and 2,174,762 to Schuette et al. and No. 2,677,700 to Jackson et al.

The preferred wetting agents are the non-ionic wetting agents selected from the condensation product of 1 mol of a primary, branched chain tridecyl alcohol and 8 to 15, preferably 8 to 10, mols of ethylene oxide and the condensation product of 1 mol of tall oil and 3 to 10, preferably 4–6, mols of ethylene oxide.

The dispersions employed in accordance with the present invention preferably have a liquid phase composed entirely or substantially entirely of water. The application of such dispersions to the cotton boll as hereinbefore described usually results in the deposition of small amounts of water, that is, usually results in seed cotton having less than 15% by weight of total water on the bone dry weight of the cotton fibers of the boll. This amount of water usually is the maximum, and the picked cotton dries to some extent during and subsequent to the picking, but prior to ginning, so that the amount of water in the seed cotton prior to ginning is usually less than 10% by weight and does not adversely affect the ginning operation. The water-insoluble inorganic compound applied to the cotton boll becomes quite uniformly dispersed on the cotton fibers during the ginning operation, and therefore is available, if it is an inter-fiber friction promoting agent, to enhance the processing characteristics of the cotton fibers during the ginning and subsequent processing operations. In fact the agent is more uniformly distributed on the cotton fibers and thus imparts more uniform processing characteristics to the fibers than has been possible heretofore without the disadvantages heretofore encountered in the application of such agents to the fibers. Among other advantages gained by such uniform distribution of the agent on the fibers when such fibers are employed in textile use is the enhanced efficiency of utilization of such agent for improving inter-fiber friction, and more uniform textile products in regard to strength, freedom from neps, etc., all other factors being equal. Further, the agent is tenaciously bound to the fibers after ginning so that very little if any is lost in subsequent processing of the fibers which is surprising in view of the 50–70% losses encountered when the agent is applied subsequent to the opening operation.

Insofar as the present invention is concerned with the application of the liquid dispersions of the water-insoluble inorganic compounds to rotating picking surfaces or picker spindles of mechanical cotton picking machines, the picking advantages hereinbefore referred to are obtained in the picking of all species of cotton. This is true also where the inorganic compound is also an interfiber friction or drag promoting agent. However, when the picked cotton is to be used in textile mills for preparing spun twisted yarns, most advantageous results are obtained in the subsequent processing and spinning operations when the dispersions containing such agents are applied to the cotton bolls by rotating picking surfaces or picker spindles or in other ways on short staple length cottons, that is, cotton having a staple length between about ¾ and 1¼ inches. Particular advantages are also obtained in that it enables the processing of immature cotton fibers which have heretofore caused difficulties in processing to the spun yarn stage.

It will also be understood that the ginned cotton obtained in accordance with the present invention can be blended with other fibers such as wool, rayon (regenerated cellulose) and with synthetic staple fibers such as nylon, Orlon, Dacron, Acrilan, cellulose acetate and the like which may be processed according to the cotton, wool or woolen spinning systems.

A further understanding of the products and processes of this invention will be obtained from the following specific examples which are intended to illustrate the invention, but are not intended to limit the scope thereof, parts and percentages being by weight unless otherwise indicated.

*Example I*

Four gallons of an aqueous dispersion containing 0.3% of colloidal alumina having a particle size in the range of 1 to 800 millimicrons and a pH of about 4 was applied at an equal rate to the horizontally projecting and rotating picker spindles of an International Harvester McCormick M–12–H mechanical cotton picker equipped with a one-row, high-drum and barbed spindles in the mechanical picking of ⅓ acre of 80% opened, undefoliated Mississippi cotton plants (Delfos 7343) having a staple length of 1¼₆ inches when graded by an experienced cotton classer. This ⅓ acre when picked yielded 1500 pounds of seed cotton and 500 pounds of ginned cotton. This resulted in the pick up of 30% of the applied dispersion on the weight of the seed cotton or the deposition of about 0.007% of colloidal alumina on the weight of the seed cotton. The total moisture content of the picked cotton was less than 15% by weight of the bone dry ginned cotton. The picker spindles were substantially free of waxes and plant juices after the picking operation, whereas when the picking was carried out with picker spindles to which water per se was applied a noticeable build up of waxes and plant juices on the picker spindle occurred. Also, there was noticeably less markoff coloring matter of the plants on the cotton picked with the colloidal alumina dispersion than in the case of cotton picked with water per se. A visible examination of the rows of cotton plants picked with the use of the colloidal alumina dispersion showed that these plants contained considerably less unpicked cotton bolls than in the case of rows of cotton plants on the same acreage picked with water per se.

The picked cotton was next ginned and it was found that the seed cotton containing the colloidal alumina could be ginned in the normal way without adverse effects. During the ginning the colloidal alumina was distributed rather uniformly on the ginned cotton fibers and the ginned cotton had a harder and harsher hand than ginned cotton picked with water per se. The amount of colloidal alumina on the ginned cotton was about 0.02% based on the bone dry ginned cotton.

*Example II*

The mechanical picking of cotton plants was carried out on identical cotton plants and using the same procedure as described in Example I with the exception that an aqueous dispersion of calcium sulfate particles within the range of 1 millimicron to 10 microns was used instead of the colloidal alumina dispersion. The calcium sulfate dispersion had a pH of about 7 and was stable to the extent that less than 10% of the particles settled out of the dispersion during the picking operations. The results obtained were substantially identical with those obtained using the colloidal alumina dispersion of Example I.

*Example III*

The mechanical picking of cotton plants was carried out on identical cotton plants and using the same procedure as described in Example I with the exception that an aqueous dispersion of tricalcium phosphate particles within the range of 1 millimicron to 10 microns was used instead of the colloidal alumina dispersion. The tricalcium phosphate dispersion was slightly alkaline and was stable to the extent that less than 10% of the particles settled out of the dispersion during the picking operations. The results obtained were substantially identical with those obtained using the colloidal alumina and calcium sulfate dispersions of Examples I and II, respectively.

*Example IV*

The mechanical picking of cotton plants was carried out on identical cotton plants and using the same procedure as described in Example I with the exception that a stable primary aqueous dispersion of colloidal silica was used instead of the colloidal alumina dispersion. This dispersion of colloidal silica was stable for at least 12 months, had a pH of 9.5 and contained average particles having a diameter within the range of 20 to 200 millimicrons and an extinction coefficient in excess of 0.03. The silica to $Na_2O$ ratio of this dispersion was about 100:1 as determined by volumetric titration to a pH of 3.8 (glass electrode). This dispersion was produced in accordance with the process of Example I of U.S. Patent No. 2,572,578. The picking results were somewhat similar to those of Example I of the present application (using colloidal alumina), but were superior to those obtained with colloidal alumina in all respects. In addition, the cotton had a harder and harsher hand and exhibited greater inter-fiber friction or drag during the ginning operation than in the case of seed and ginned cotton containing colloidal alumina.

The ginned cotton containing colloidal silica was baled and subsequently the bale was broken, opened and processed into 22's and 50's carded yarns and 22's and 50's combed yarns using conventional cotton precessing and spinning machinery. The ginned cotton was classified as strict low middling with a staple length of 1¼₆ inches and a fiber length (Fibrograph) of 1.02 inches. The carding rate was 9.5 pounds per hour and the comber setting used for the combed yarns was 0.42 inch. The spinning was carried out at a twist multiplier of 3.9.

The break factor (which was the average for the 22's and 50's yarns) for the carded yarns was 2242, and for the combed yarns 2502.

In contrast to the foregoing, control yarns prepared from cotton from the same field but picked with water per se on the picker spindles had a break factor (which was the average for the 22's and 50's yarns) of 2148 in the case of carded yarns and 2456 in the case of combed yarns at the same twist multiplier (3.9).

It is thus seen that the carded yarns and combed yarns prepared from the cotton picked with colloidal silica dispersion applied to the picker spindles have a significantly higher average break factor than carded yarns and combed yarns prepared from cotton picked from the same field but using water per se on the picker spindles, at the same twist multiplier. This experiment shows that the application of sufficient amounts of colloidal silica to seed cotton at the picker spindle not only improves the picking operation, but also imparts increased drag to the fibers which carries into the spun twisted yarns prepared from the picked cotton.

*Example V*

Picking experiments and the preparation of cotton yarns from the picked cotton were carried out according to the procedure described in Example IV with the exception that the dispersion of colloidal silica also contained 0.4% of a surface-active condensation product of 1 mol of a primary, branched chain tridecyl alcohol and 9 mols of ethylene oxide. The results obtained were substantially the same as in Example IV, but the yarns had a slightly higher nep count.

*Example VI*

Picking experiments and the preparation of cotton yarns from the picked cotton were carried out according to the procedure described in Example IV with the exception that the dispersion was a secondary dispersion of 0.3% colloidal silica and 0.2% sodium dodecylbenzene sulfonate. This dispersion was stable for at least 6 months, had a pH of 10.7, an extinction coefficient in excess of 0.035, a silica to $Na_2O$ ratio above 10:1 and contained average particles measuring between about 350 and 450 millimicrons. The results obtained were substantially similar to those of Example IV, but the carded and combed yarns had a somewhat higher average break factor.

*Example VII*

Four gallons of the same primary aqueous dispersion of colloidal silica as was used in Example IV but containing 3.9% of silica was applied at an equal rate in the form of a film on the horizontally projecting and rotating picker spindles of an International Harvester McCormick M–12–H mechanical cotton picker equipped with a one-row, high-drum and barbed spindles in the mechanical picking of opened, defoliated Mississippi cotton plants having a staple length of 1 1/16 inches as graded by an experienced cotton classer. The above amount of dispersion was used in the picking of 1500 pounds of seed cotton which yielded about 500 pounds of ginned cotton. The percentage of total dispersion picked up by the picked seed cotton was about 65%. The total moisture content of the picked cotton was less than 15% by weight of the bone dry ginned cotton. The picker spindles were substantially free of waxes during and after the picking operation, and very little markoff of plant coloring matter on the cotton was noted.

The picked cotton was then ginned and it was found that the seed cotton containing the colloidal silica could be ginned in the normal way without adverse effects. The cotton had a harder and harsher hand and exhibited somewhat greater interfiber friction or drag during the ginning operation than in the case of the seed and ginned cotton of Example IV. The amount of colloidal silica on the ginned cotton was about 0.12% based on the bone dry ginned cotton.

The ginned cotton was baled and shipped to a laboratory pilot spinning mill where the bale was broken, opened and processed into 22's carded and combed yarns at twist multiples of 3.00, 3.25, 3.50 and 3.75, and into 50's carded and combed yarns at twist multiples of 3.00, 3.25 and 3.50. The ginned cotton was classified as strict low middling with a staple length of 1 1/16 inches, and a fiber length (Fibrograph) of 1.11 inches. The carding rate was 9.5 pounds per hour and the comber setting used for the combed yarns was 0.42 inch. The spinning was carried out at the twist multiples referred to above. The data as to the break factors of the various spun yarns and that of control yarns prepared from cotton from the same field but picked with water per se are given in the tables below.

Cotton from the same field was picked in the same manner using an otherwise identical primary aqueous dispersion containing 7.9% of colloidal silica, and was then ginned, baled and processed in a laboratory pilot spinning mill in the same manner as described above. The amount of colloidal silica on the ginned cotton was about 0.25% based on the bone dry ginned cotton. The ginned cotton was processed into 22's and 50's carded and combed yarns at various twist multiples of 4.0 or less. The ginned cotton was classified as strict low middling with a staple of 1 1/16 inches, and a fiber length (Fibrograph) of 1.13 inches. The carding rate was 9.5 pounds per hour and the comber setting used for the combed yarns was 0.42 inch. The spinning was carried out at twist multiples of 3.00, 3.25, 3.50, 3.75 and 4.00. The date as to the break factors of the various spun yarns prepared from this cotton is given in the following tables.

| Twist Multiple | Break Factor of Carded 22's Yarns | | | Break Factor of Carded 50's Yarns | | |
|---|---|---|---|---|---|---|
| | Control Yarns | Cotton Picked with 3.9% Dispersion | Cotton Picked with 7.8% Dispersion | Control Yarns | Cotton Picked with 3.9% Dispersion | Cotton Picked with 7.8% Dispersion |
| 3.00 | 1,870 | 2,039 | 2,169 | 1,505 | 1,575 | 1,725 |
| 3.25 | 2,165 | 2,264 | 2,319 | 1,770 | 1,795 | 1,905 |
| 3.50 | 2,303 | 2,354 | 2,411 | 1,900 | 1,905 | 1,970 |
| 3.75 | 2,363 | 2,394 | 2,453 | 1,960 | ---------- | 2,015 |
| 4.00 | 2,446 | ---------- | 2,460 | 1,973 | ---------- | 1,995 |

| Twist Multiple | Break Factor of Combed 22's Yarns | | | Break Factor of Combed 50's Yarns | | |
|---|---|---|---|---|---|---|
| | Control Yarns | Cotton Picked with 3.9% Dispersion | Cotton Picked with 7.8% Dispersion | Control Yarns | Cotton Picked with 3.9% Dispersion | Cotton Picked with 7.8% Dispersion |
| 3.00 | 2,185 | 2,354 | 2,482 | 1,820 | 1,940 | 2,015 |
| 3.25 | 2,413 | 2,539 | 2,609 | 1,995 | 2,065 | 2,100 |
| 3.50 | 2,530 | 2,625 | 2,677 | 2,065 | 2,125 | 2,140 |
| 3.75 | 2,594 | 2,658 | 2,708 | 2,125 | ---------- | 2,140 |
| 4.00 | 2,679 | ---------- | 2,682 | 2,140 | ---------- | 2,155 |

*Note.*—All of the above data represent the average of 25 tests.

When the colloidal silica or other inter-fiber friction promoting agent is applied to the cotton bolls on the cotton plant by means of picker spindles or in other ways in sufficient quantities and the picked cotton is subsequently spun into a yarn, it is possible to reduce the number of turns per inch in the yarn prepared therefrom as a result of the reduced slippage or increased drag imparted by such agent. This in turn permits a considerable speeding up of the spinning process and causes a marked increase in the tensile strength of the yarn. Other advantages are also obtained. Thus the ginned cotton whether used per se or blended with other fibers may be carded more uniformly due to the resulting increase in drag or coefficient of friction of the fiber surfaces, and it is also possible to produce a stronger web and a stronger and more uniform sliver than is otherwise possible. Moreover, the agent does not dust from the fibers to any appreciable extent in contrast to those cases where the agent is applied to the cotton fibers in the opening stage (stage 4, supra) or subsequent thereto which means that more silica is retained on the fibers and this increases the interfiber friction of the fibers. Also, in following the present invention, wherein such agents are applied to the seed cotton by means of rotating picking surfaces or the picker spindles or in other ways, it is possible to produce yarns having the same or greater tensile strength than yarns prepared from untreated or water-treated fibers even though the number of turns per inch of the treated yarns is substantially less than the number of turns per inch required to give maximum strength to yarns prepared from such untreated fibers.

In the embodiments of the invention referred to herein and illustrated in greater detail in Examples IV to VII, it will be understood that the present invention is applicable to the production of yarns having greater or smaller yarn numbers than those referred to in Examples IV to VII, for example, yarn numbers of 8's, 33's, 66's, etc. However, the present invention is particularly applicable to the production of carded and combed yarns having yarn numbers in the range of 8's to 50's spun at twist multiples in the range of 3.00 to 4.00. Although improved results are obtained with combed yarns having yarn numbers above 50's, especially at twist multiples of 4.00 and less, and having a relatively high silica or other friction-promoting agent content, it is preferred to utilize the present invention in the production of combed and carded yarns of lower yarn numbers, preferably in the range of 8's to 33's for carded yarns and 11's to 50's for combed yarns. Further, the twist multiple used is of some significance. Thus, in the case of carded and combed yarns, most significant improvements in average break factor and yarn strength are obtained when the yarns are produced at twist multiples in the range of 2.50 to 4.00, and more particularly in the range of 2.75 to 3.50 for carded yarns and in the range 2.50 to 3.75 for combed yarns. The amount of silica applied to the seed cotton is also significant in respect to the improvement obtained. Thus, higher amounts of silica, say about 0.2 to 0.7% based on the bone dry weight of ginned cotton give significant differences in break factor, as compared to cotton picked with water per se, in carded and combed yarns of higher yarn numbers, for example, above 33's and at twist multiples of 4.00 and higher. Whereas significant differences are difficult to achieve under similar circumstances where smaller amounts of silica are used. Another factor of significance is the type of yarn produced. In general, more significant improvements are obtained with combed yarns than with carded yarns over a wider range of yarn numbers. Thus, significant differences in break factor and yarn strength are obtained with combed yarns of higher yarn numbers such as 66's over a variety of twist multiples, whereas in the case of carded yarns significant improvements in 66's yarns are usually only attained at the lower twist multiples in the range of 3.00 to 3.50.

This application is a continuation-in-part of my co-pending application Serial No. 658,246, now abandoned, filed May 10, 1957.

What is claimed is:
1. In a process wherein cotton bolls are picked from cotton plants and the picked cotton is subjected to operations employed to prepare it for spinning and is ultimately spun into a twisted yarn selected from the group of carded and combed yarns at a twist multiple between about 2.5 and 4.0, the improvement which comprises applying to the cotton fibers in the bolls at some stage prior to picking to concurrent with picking an aqueous dispersion of a substantially colorless, water-insoluble, inter-fiber friction promoting inorganic compound in an amount sufficient to provide from about 0.02 to about 1% by weight of said compound based on the bone dry weight of the cotton fibers in the cotton boll.

2. A process as in claim 1, but further characterized in that said compound is colloidal silica which is applied in amounts of about 0.08 to about 0.7% by weight based on the bone dry weight of the cotton fibers in the cotton boll.

3. A process as in claim 1, but further characterized in that said dispersion is a primary aqueous colloidal dispersion having a pH between about 8.5 and 10.7 of silica particles having an ultimate particle size of about 10 to 40 millimicrons and an agglomerate particle size between about 15 and 400 millimicrons, said dispersion being further characterized in that it has a silica to alkali (calculated as $Na_2O$) ratio of about 10:1 to 500:1 and an extinction coefficient greater than 0.025.

4. A process as in claim 1, but further characterized in that said dispersion is a secondary aqueous colloidal dispersion of silica.

5. A process as in claim 1, but further characterized in that said dispersion contains a small amount of a compatible wetting agent.

6. A process as in claim 5, but further characterized in that said wetting agent is a condensation product of a hydrophobe organic compound having from 1 to 2 reactive hydrogens and sufficient ethylene oxide to render the condensation product soluble to colloidally dispersible in water.

7. In a process wherein cotton bolls containing cotton fibers having a staple length between about three-fourths and one and one-sixteenth inches are picked from cotton plants and the picked cotton is subjected to operations employed to prepare it for spinning and is ultimately carded and spun into a twisted yarn having a yarn number in the range of 8's to 33's at a twist multiple in the range of 2.75 to 3.5, the improvement which comprises applying to the cotton fibers in the bolls concurrent with picking an aqueous colloidal dispersion of silica in which the ultimate particles of silica have a size of about 10 to 40 millimicrons, said dispersion being applied in an amount sufficient to provide from about 0.2 to 0.7% of silica based on the bone dry weight of ginned cotton prepared from said cotton fibers.

8. A process as in claim 7, but further characterized in that said dispersion contains about 0.001 to 1% by weight of a compatible wetting agent.

9. A process as in claim 8, but further characterized in that said wetting agent is a water soluble to colloidally dispersible anionic agent selected from the group consisting of sulfonated and sulfated organic compound wetting agents.

10. A process as in claim 8, but further characterized in that said wetting agent is a condensation product of a hydrophobe organic compound having from 1 to 2 reactive hydrogens and sufficient ethylene oxide to render the condensation product soluble to colloidally dispersible in water.

References Cited in the file of this patent
UNITED STATES PATENTS

| | | |
|---|---|---|
| 2,244,325 | Bird | June 3, 1944 |
| 2,375,738 | White | May 8, 1945 |
| 2,433,083 | Baker et al. | Dec. 23, 1947 |
| 2,443,512 | Powers et al. | June 15, 1948 |
| 2,572,578 | Trail | Oct. 23, 1951 |
| 2,637,156 | Rust | May 5, 1953 |
| 2,741,600 | Allen | Apr. 10, 1956 |